(12) United States Patent
Chen et al.

(10) Patent No.: US 8,792,853 B2
(45) Date of Patent: Jul. 29, 2014

(54) MESSAGE BROADCASTING OVER WIRELESS NETWORKS

(75) Inventors: An Mei Chen, San Diego, CA (US); Ravinder Paul Chandhok, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 851 days.

(21) Appl. No.: 12/328,589

(22) Filed: Dec. 4, 2008

(65) Prior Publication Data

US 2010/0142438 A1 Jun. 10, 2010

(51) Int. Cl.
*H04W 88/02* (2009.01)

(52) U.S. Cl.
USPC ...................................... 455/404.1

(58) Field of Classification Search
USPC ............... 455/404.1, 3.01; 375/133, 346; 370/593.13, 392; 725/25; 340/593.13
See application file for complete search history.

(56) References Cited

U.S. PATENT DOCUMENTS

| | | | |
|---|---|---|---|
| 2005/0020236 A1* | 1/2005 | Mauney et al. ............... | 455/403 |
| 2005/0037728 A1 | 2/2005 | Binzel | |
| 2005/0159107 A1* | 7/2005 | Mauney et al. .............. | 455/41.2 |
| 2007/0280235 A1 | 12/2007 | Chen et al. | |
| 2009/0180403 A1* | 7/2009 | Tudosoiu ...................... | 370/278 |
| 2010/0150122 A1* | 6/2010 | Berger et al. ................. | 370/338 |

FOREIGN PATENT DOCUMENTS

| | | |
|---|---|---|
| CN | 1894949 A | 1/2007 |
| WO | 2005020593 A2 | 3/2005 |
| WO | 2008005681 | 1/2008 |
| WO | 2008097894 | 8/2008 |

OTHER PUBLICATIONS

International Search Report, PCT/US2009/066631, International Searching Authority, European Patent Office, Mar. 11, 2010 I 1.
Written Opinion, PCT/US2009/066631, International Searching Authority, European Patent Office, Mar. 11, 2010 —.

* cited by examiner

*Primary Examiner* — Diane Mizrahi
(74) *Attorney, Agent, or Firm* — Arent Fox LLP

(57) ABSTRACT

Systems and methodologies are described that facilitate broadcasting and receiving messages in a wireless media broadcast network. Mobile devices are equipped to receive media over a broadcast network where presentation of the data can be enabled through a content policy. Broadcast messages can be provisioned and delivered over the network such that mobile devices can receive the message regardless of the level or existence of purchased content. The messages can be broadcast for multiple purposes, including emergency messages, which can come from an emergency or amber alert system, venue and/or location specific messages, etc. The messages can be broadcast at a regional level as well by leveraging such functionality of the media broadcast network.

60 Claims, 10 Drawing Sheets

MESSAGE BROADCASTING OVER WIRELESS NETWORKS

BACKGROUND

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), MediaFLO, etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth. In addition, mobile devices can communicate with other mobile devices (and/or base stations with other base stations) in peer-to-peer wireless network configurations.

Some wireless networks allow point to point bi-directional (forward and reverse links) communication between the devices on the wireless network. Such networks are referred to herein as unicast networks and may comprise, for example, 3G or WIFI networks. Some wireless networks employ transmitters that enables a unidirectional (forward link only) broadcast of data to any mobile devices capable of receiving the signal within the range of the transmitter. Such network are referred to herein as broadcast networks. One example of a wireless broadcast network is the MediaFLO broadcast network The MediaFLO broadcast network comprises a network operation center (NOC) that receive content from one or more content providers. The NOC provides programming signals to regional FLO transmitters that in-turn transmit a FLO signal for receipt by MediaFLO enabled mobile devices. MediaFLO enabled mobile devices are equipped with antennas to receive and chipsets to decode FLO signals. The NOC is coupled with one or more unicast networks, such as a 3G or a WIFI network, to create bidirectional link with each mobile device. The unicast network may be used for a variety of functions, for example to provide the appropriate keys to individual mobile devices and to provide content policies for individual mobile devices. These keys and policies can be utilized by to restrict which portions of the broadcast data are presented to a user of the mobile device. This allows the mobile devices to subscribe for data transmitted over the MediaFLO network, such as mobile television, other video clips, audio, and/or the like, and receive the data according to the subscription. Additionally, transmitters for the broadcast network can filter broadcast data that it sends to area devices allowing regional specification of content. The ability to broadcast data to a subset of devices capable of receiving the broadcast provides multicast functions in a broadcast network.

In mobile broadcast networks like the MediaFLO network, the unicast network may be used to message the mobile devices. However, it is often more efficient to deliver messages via the broadcast network. However, not all of the capabilities associated with unicast messaging have been replicated for a broadcast environment.

SUMMARY

The following presents a simplified summary of one or more embodiments in-order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with facilitating transmitting messages to a plurality of mobile devices over a broadcast network. In one example, the mobile devices can be equipped to receive data via the broadcast network but can have content policy enforcement to control propagation of at least a portion of the broadcast data to an application or user of the mobile device. The messages can also be received and processed by the mobile devices regardless of the content policy enforcement. According to an example, a message can relate to an emergency or amber alert. Mobile devices equipped to receive such messages can forward the emergency message to an application or user of the mobile device regardless of whether the content policy allows the mobile device to generally receive broadcast data.

According to related aspects, a method for receiving messages over a wireless broadcast network is provided. The method can comprise detecting a modification of an overhead information symbol for a control channel in a broadcast network and monitoring the control channel from a mobile device based at least in part on the detected modification to receive a broadcast message. The method can also include forwarding the broadcast message to an application executing on the mobile device.

Another aspect relates to a wireless communications apparatus. The wireless communications apparatus can include at least one processor configured to determine a sequence number modification related to a control channel in a wireless broadcast network and receive a message by monitoring the control channel via a data stack based on the determined sequence number modification. The processor is further configured to present the message to an application executing on the processor for rendering the message. The processor is further configured to demodulate the signals over the demodulators utilizing the appropriate allocation.

Yet another aspect relates to a wireless communications apparatus that facilitates presenting a message received over a wireless media broadcast network. The wireless communications apparatus can comprise means for receiving notification of an overhead information symbol modification related to a control channel in a wireless broadcast network. The wireless communications apparatus can additionally include means for receiving a message over the control channel based at least in part on the modification and means for transmitting the message to an application executing on the wireless communications apparatus.

Still another aspect relates to a computer program product, which can have a computer-readable medium including code for causing at least one computer to detect a modification of an overhead information symbol for a control channel in a broadcast network. The computer-readable medium can also comprise code for causing the at least one computer to monitor the control channel based at least in part on the detected modification to receive a message. Moreover, the computer-readable medium can comprise code for causing the at least one computer to forward the message to an application.

Another aspect relates to an apparatus. The apparatus comprises a message detector that determines a modification to data related to a control channel in a wireless broadcast network and a broadcast data stack that receives a message over the control channel based at least in part on the determined modification. The apparatus further comprises a message analyzer that evaluates one or more aspects of the broadcast message indicating relevancy to at least one application executing on the apparatus.

According to a further aspect, a method for facilitating broadcasting messages in a wireless broadcast network is provided. The method can include constructing a message based at least in part on received message data and a time span for broadcasting the message as well as modifying one or more overhead information symbols related to a control channel. The method can further include transmitting the message over the control channel for the time span to one or more broadcast transmitters for subsequent broadcast to a plurality of mobile devices.

Another aspect relates to a wireless communications apparatus. The wireless communications apparatus can include at least one processor configured to create a broadcast message comprising received parameters corresponding to message content, a start time and end time for broadcasting, and a region to receive the broadcast message and increment a sequence number related to a control channel to indicate subsequent broadcast of the broadcast message. The processor is further configured to select one or more broadcast transmitters for broadcasting the broadcast message based at least in part on the region and transmit the broadcast message over the control channel to the broadcast transmitters between the start time and the end time. The processor is further configured to demodulate the signals over the demodulators utilizing the appropriate allocation.

Yet another aspect relates to a wireless communications apparatus for broadcasting messages over a wireless media broadcast network. The wireless communications apparatus can comprise means for creating a message from data received specifying content, time span, and/or a region for broadcasting the message and means for modifying a parameter related to a control channel in a wireless broadcast network to indicate message broadcast. The wireless communications apparatus further comprises means for transmitting the broadcast message to a plurality of broadcast transmitters over the control channel for the given time span Still another aspect relates to a computer program product, which can have a computer-readable medium including code for causing at least one computer to construct a message based at least in part on received message data and a time span for broadcasting the message. The computer-readable medium can also comprise code for causing the at least one computer to modify one or more overhead information symbols related to a control channel. Moreover, the computer-readable medium can comprise code for causing the at least one computer to transmit the message over the control channel for the time span to one or more broadcast transmitters for subsequent broadcast to a plurality of mobile devices.

Another aspect relates to an apparatus. The apparatus comprises a data receiver that obtains parameters for broadcasting a message in a wireless media broadcast network and a message constructor that generates a message based at least in part on the obtained parameters and modifies information related to a control channel to indicate broadcast of the message. The apparatus further comprises a message broadcaster that transmits the message to one or more broadcast transmitters for propagation to a plurality of mobile devices.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
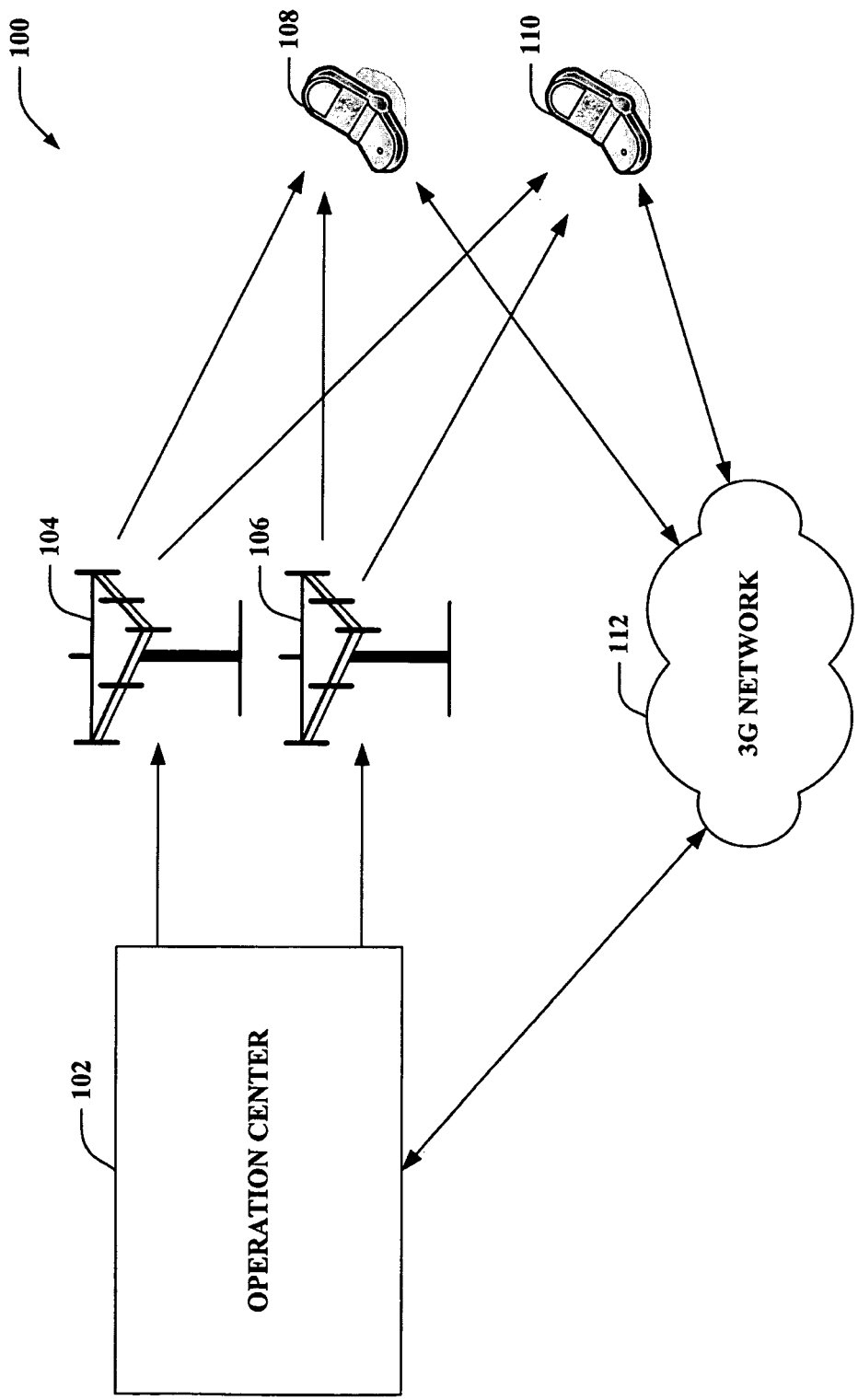
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in-order to provide a thorough understanding of one or more embodiments. It may be evident, however, that such embodiment(s) can be practiced without these specific details. In other instances, well-known structures and devices are shown in block diagram form in-order to facilitate describing one or more embodiments.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a mobile device. A mobile device can also be called a system, subscriber unit, subscriber station, mobile station, mobile, remote station, remote terminal, access terminal, user terminal, terminal, wireless communication device, user agent, user device, or user equipment (UE). A mobile device can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with mobile device(s) and can also be referred to as an access point, Node B, evolved Node B (eNode B or eNB), base transceiver station (BTS) or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

The techniques described herein may be used for various wireless communication systems such as code division multiple access (CDMA), time division multiple access (TDMA), frequency division multiple access (FDMA), orthogonal frequency division multiple access (OFDMA), single carrier frequency domain multiplexing (SC-FDMA) and other systems. The terms "system" and "network" are often used interchangeably. A CDMA system may implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). CDMA2000 and UMB are described in documents from an organization named "3rd Generation Partnership Project 2" (3GPP2). Additionally, the techniques described herein can be employed in broadcast networks, such as a MediaFLO network, that allow efficient broadcast transmission of data to a plurality of mobile devices without requiring a reverse link for requesting such data.

Referring now to FIG. 1, a wireless communication system 100 is illustrated in accordance with various embodiments presented herein. System 100 comprises a server 102, referred to herein as the network operation center (NOC) 102, where broadcast data can be generated and/or otherwise specified for transmission. In one example, one or more information sources (not shown) can feed data into the operations center 102 for broadcast transmission thereof. The system can include a plurality of transmitters 104 and 106 that receive data for transmission from the NOC 102 and/or other transmitters, repeaters, etc. (not shown). In one example, the transmitters 104 and 106 can include multiple antenna groups and/or a transmitter chain that can in turn comprise a plurality of components associated with signal transmission and reception (e.g., processors, modulators, multiplexers, antennas, etc. (not shown)), as will be appreciated by one skilled in the art.

Transmitters 104 and 106 can broadcast data to one or more mobile devices such as mobile device 108 and mobile device 110. It is to be appreciated that substantially any number of in-range mobile devices similar to mobile devices 108 and 110 can receive the broadcast signal. Mobile devices 108 and 110 can be, for example, cellular phones, smart phones, laptops, handheld communication devices, handheld computing devices, satellite radios, global positioning systems, PDAs, and/or any other suitable device for communicating over wireless communication system 100. As depicted, mobile devices 108 and 110 are both receiving broadcast data from transmitters 104 and 106 over a forward link. It is to be appreciated, however, that the mobile devices 108 and/or 110 can receive data from only one or neither of transmitters 104 and/or 106. This can be based on a range of the mobile device from the transmitter, quality of communications, frequency spectrum, and/or the like. Moreover, the mobile devices 108 and 110 can be equipped to receive the broadcast signals from the transmitters 104 and/or 106. In a frequency division duplex (FDD) system, the transmitters 104 and 106 can utilize a different frequency bands to transmit the broadcast data, for example, and indeed, different content can be transmitted over the different frequency bands, in one example. Further, in a time division duplex (TDD) system, the transmitters 104 and/or 106 can utilize a common frequency band to transmit the broadcast data.

Each group of antennas and/or the area in which they are designated to communicate can be referred to as a sector of transmitter 104 and/or 106. For example, antenna groups can be designed to communicate to mobile devices in a sector of the areas covered by transmitters 104 and/or 106. The transmitters 104 and/or 106 can utilize beamforming to improve signal-to-noise ratio of the broadcast for mobile devices 108 and 110. Also, while transmitters 104 and/or 106 utilize beamforming to transmit to mobile devices 108 and 110 scattered randomly through an associated coverage, mobile devices in neighboring cells can be subject to less interference as compared to a transmitter transmitting through a single antenna to all its mobile devices. In addition, transmitters 104 and/or 106 can filter data received from the NOC 102 before transmitting to mobile devices 108/110. In one example, the transmitters 104 and/or 106 can filter data based at least in part on a region specification; thus, data dealing with disparate regions need not be transmitted to the mobile devices 108/110.

In addition, system 100 includes a 3G network 112 that is leveraged by the mobile devices 108/110 to determine a content policy for the device, such that only data for which the mobile device 108/110 has subscribed can be properly decoded and presented to an application or user of the mobile device 108/110. The content policies, in one example, can be accessible by the NOC 102, and the mobile devices 108 and/or 110 can communicate over the 3G network 112 to receive policy information and/or authorization based on the policy for the mobile device 108/110. It is to be appreciated that the mobile devices 108/110 can subscribe for no content over the broadcast network, in one example, but are equipped to receive signals from the broadcast network. In this regard, though the mobile devices 108/110 are receiving the data, they do not decode data where the respective content policy does not permit receipt. In addition, the mobile devices 108/110 can similarly filter content based on region, as configured by the mobile device 108/110 and/or an application thereof. Placing the onus on the mobile device 108/110 to enforce content policy allows for efficient broadcast of data as the broadcast stream need not be interrupted by authentication, authorization, and/or request type information.

Furthermore, the mobile devices 108/110 can additionally utilize the 3G network 112 for conventional wireless communications with other mobile devices or wireless network components. In one example, the system 100 can form a MediaFLO network where the transmitters 104 and/or 106 can be part of a MediaFLO transmit subsystem (MFTS) that broadcast media data, such as mobile television, video clips, audio, and/or the like. In addition, there can be additional components between the NOC 102 and transmitters 104/106, such as a multiplexer, other transmitters, repeaters, etc.

According to an example, system 100 can utilize substantially any type of duplexing technique to divide communication channels for the broadcast data (e.g., forward link, reverse link, . . . ) such as FDD, TDD, and the like. In one example, the broadcast network can be utilized to broadcast messages to devices 108/110. The messages, in one example, can be decoded by the devices 108 and/or 110 regardless of whether the content policy permits receiving and decoding of data on the broadcast network. Thus, the messages can originate at the NOC 102, in one example, and/or a node between the NOC 102 and transmitters 104/106, and can be broadcast from the transmitters 104/106 to the mobile devices 108/110. The mobile devices 108/110 can decode the message and deliver it to an upper layer application for presentation and/or notification to a user of the mobile device 108/110. In one example, this can be utilized for emergency messages, such as amber alert. In this regard, emergency systems can communicate with the NOC 102 to formulate and broadcast such messages. Messages can be transmitted from the NOC 102 to the transmitters 104/106, which can filter out messages according to region, subject, content, etc., and broadcast remaining messages to the mobile devices 108/110. The mobile devices 108/110, and/or applications executing thereon, can receive and analyze the messages to determine whether to present and/or notify the user of the message. This can operate independently of content policy considerations present when broadcasting media data over the broadcast network. In one example, the messages can link and/or offer subscription to receive media content over the broadcast network.

According to an example, the mobile devices 108/110 can efficiently receive the broadcast messages by suspending receipt and/or processing of broadcast data. Rather, upon transmitting a broadcast message, the transmitters 104/106 can increment a sequence number on a control channel. The mobile devices 108/110 can periodically monitor the sequence number to determine if a message is being transmitted. Thus, the mobile devices 108/110 can determine when new message arrive regardless of whether they are receiving broadcast data at the time. If the sequence number on the control channel is incremented, the mobile devices 108/110 can realize the change and determine if a relevant broadcast message is present. The relevancy determination can be made, for example, based on region, subject, content, etc. according to an application and/or one or more configuration settings on the mobile device 108/110. If the message is relevant to the mobile device 108/110, it can be forwarded to an application executing thereon and/or otherwise presented to a user of the mobile device 108/110.

Figure 2:
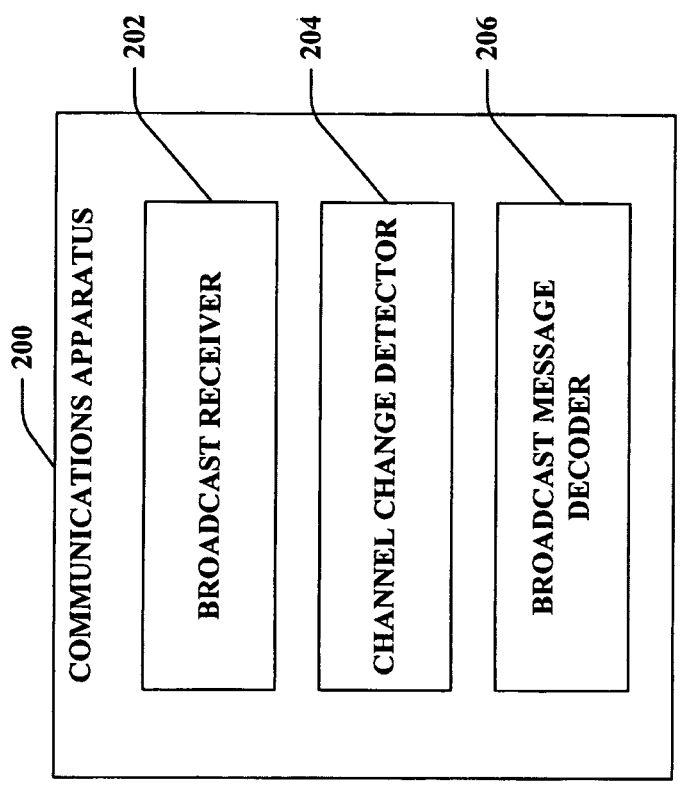
FIG. 2 is an illustration of an example communications apparatus for employment within a wireless communications environment.

Turning to FIG. 2, illustrated is a communications apparatus 200 for employment within a wireless communications environment. The communications apparatus 200 can be a transmitter (such as an MFTS) or a portion thereof, a mobile device or a portion thereof, or substantially any communications apparatus that receives data transmitted in a wireless communications environment. The communications apparatus 200 can include a broadcast receiver 202 that can receive broadcast data in a wireless broadcast network, a channel change detector 204 that can determine if a message has been broadcast based at least in part on a detected change in a channel or information related thereto, and a broadcast message decoder 206 that can decode and analyze a broadcast message to determine subsequent action related to the message.

In one example, the communications apparatus 200 can communicate in a wireless broadcast network. The broadcast receiver 202 can be capable of receiving broadcast data in the network, such as media (e.g., mobile TV, other video, audio, and/or the like). As described, the communications apparatus 200 can regulate content presented to applications and/or users of the mobile device; this can be based on a locally or remotely stored policy, for example. However, the broadcast messages can be transmitted over the broadcast network unregulated by the policy. For example, the channel change detector 204 can determine that a change has occurred on a channel, such as a control channel, indicating presence of a broadcast message. By continually monitoring for change on the control channel, the communications apparatus efficiently checks for messages without utilizing resources on receiving/processing unsolicited content from the broadcast network.

The broadcast message decoder 206 can evaluate the message to determine whether the message is relevant to the communications apparatus 200 and/or an application executing thereon. In one example, the message can be an emergency or amber alert type of event, which the broadcast message decoder 206 can forward to an emergency notification application or a general message application (such as short messaging service (SMS)) executing on the communications apparatus 200 to notify a user of the alert. The broadcast message decoder 206, however, can initially evaluate a region associated with the alert to ensure the communications apparatus 200 is in the correct region to receive the message. In another example, such region controlling can be additionally or alternatively present in the transmitter of a message, as described. Further, the message can comprise other data, such as a subject, keyword identifiers, etc. that can be evaluated by the broadcast message decoder 206, in one example, to determine relevance to an application or user of the communications apparatus 200.

In one example, the communications apparatus 200 can operate in a MediaFLO network where the broadcast receiver 202 can receive media content (such as TV, audio, etc.) from one or more transmitters (not shown) in a MFTS. The communications apparatus 200 can be granted authorization to decode content based on a content policy, as described; however, the MFTS can broadcast one or more messages that can be decoded regardless of content policy. For example, the MFTS can increment a sequence number of a control channel (such as an overhead information symbol (OIS)) and broadcast the message as an emergency message to one or more devices, including the communications apparatus 200. The channel change detector 204 can detect the incremented sequence number of the control channel indicating presence of a broadcast message. By monitoring a change in the sequence number, the communications apparatus 200 conserves power as compared to monitoring for a message or processing substantially all data received over the broadcast network. The broadcast receiver 202 can receive the message, and the broadcast message decoder 206 can determine information regarding the message. Such information can include a region associated with the message, a message type, subject, content, etc. If the broadcast message decoder 206 determines the message is relevant to the communications apparatus 200, it can forward the message to an application on the communications apparatus 200.

Where the message is an emergency message, for example, the broadcast message decoder 206 can determine the type of message from a parameter. Since it is an emergency message, the broadcast message decoder 206 can interpret the message and forward the content to an application for presentation/notification to a user. In another example, the broadcast message decoder 206, prior or subsequent to determining the message is an emergency, can evaluate a region associated with the message, for example, to determine if the message is geographically relevant to the communications apparatus 200. In one example, though the communications apparatus 200 can be out of a region to receive the broadcast message, the communications apparatus 200, and/or an application executing thereon, can specify that it is to receive alerts related to another region of interest. In this case, the alert can be forwarded to the application for presenting/notifying the user. Moreover, the alert message can comprise text notification as well as a link to other alert content, such as a webpage, or media sent over the broadcast network. In this regard, for example, the alert message can allow a user of the communications apparatus 200 to subscribe to view the media content, which can result in a content policy change allowing the broadcast receiver 202 to receive and process the media content.

In another example, the message can relate to an event. The communications apparatus 200 can be located at a venue, receiving broadcast network data from a transmitter near or otherwise related to the venue, for example. As described, though broadcast data can be received by the broadcast receiver 202, it can be partially or entirely ignored based on a content policy for the communications apparatus 200. However, messages can be broadcast over the transmitter related to the venue and can be received and processed by the communications apparatus 200 as described above. In one example, the message can comprise content related to the venue (e.g., statistics at a sporting event, biographical data for persons related to the venue, etc.), a link to the content, and/or an offer to purchase such. For example, the content can be broadcast over the network and received by the broadcast receiver 202 according to a policy change effectuated by a user requesting receipt of the content (through purchase, link selection, and/or the like). The message can be broadcast over the network and the transmitter can indicate presence of the message, for example by incrementing a sequence number on the control channel. The channel change detector 204 can detect the presence of the message, for example by the sequence number increment, and the broadcast message decoder 206 can process the message. The broadcast message decoder 206 can transmit the message to an application for propagation to a user; however, it is to be appreciated that the broadcast message decoder 206 can evaluate settings on the communications apparatus 200 or on a user profile with respect to transmitting such messages. For example, a user can indicate a desire not to receive such messages, and the broadcast message decoder 206 can honor this by ignoring the message upon receipt.

Figure 3:
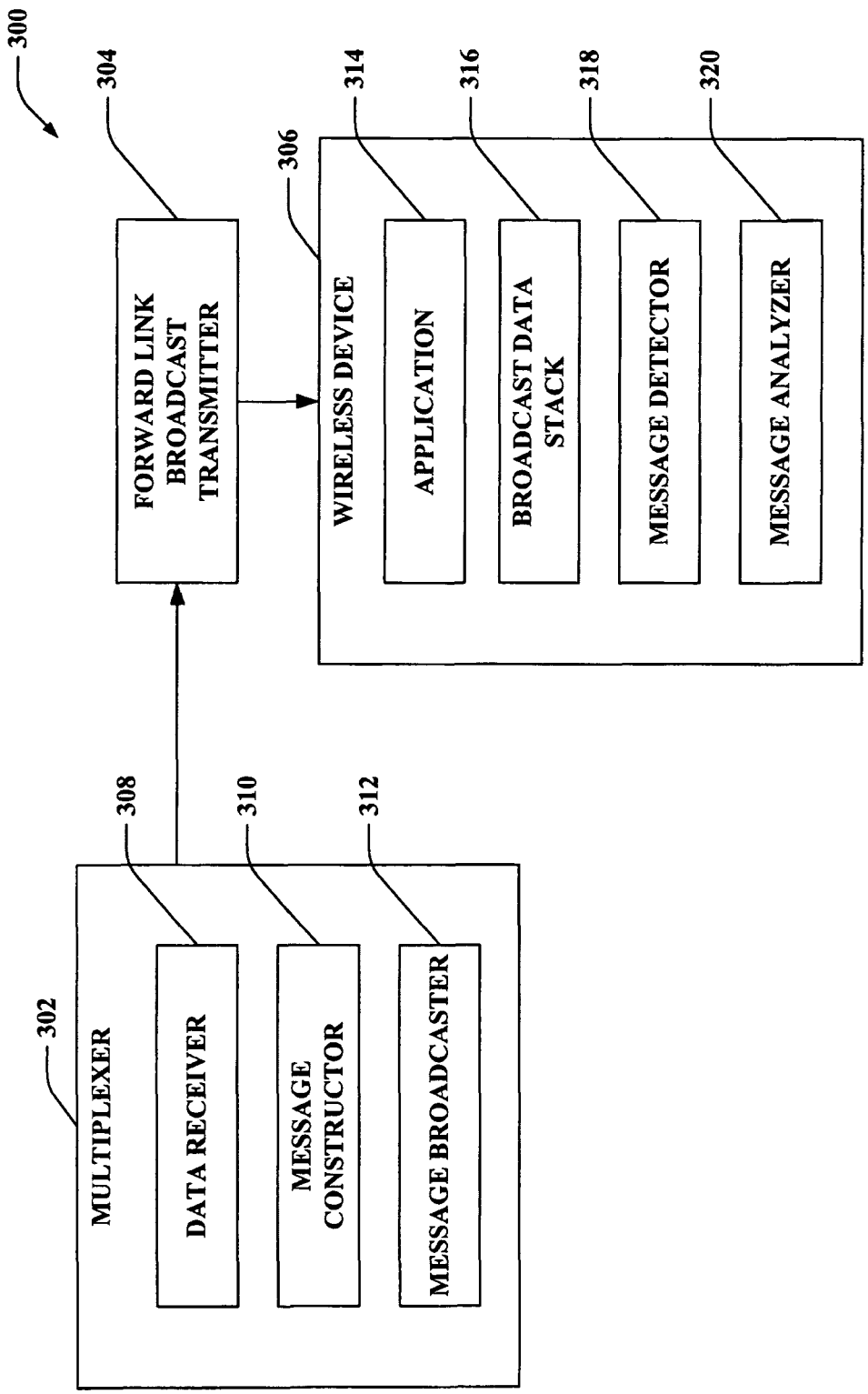
FIG. 3 is an illustration of an example wireless communications system that effectuates broadcast and receipt of messages in a broadcast environment.

Now referring to FIG. 3, illustrated is a wireless communication broadcast system 300 that can broadcast messages to wireless devices. A multiplexer 302 is provided that can transmit media and/or messages to one or more broadcast transmitters 304. The broadcast transmitter 304 can broadcast the media and/or message to one or more in-range wireless devices 306. It is to be appreciated that the wireless device 306 can additionally communicate with a bidirectional wireless network, as described supra. The multiplexer 302 can comprise a data receiver 308 that receives data from one or more sources for broadcast within a broadcast network, a message constructor 310 that can create a message from data received for transmission as a broadcast message, and a message broadcaster 312 that can broadcast the message to one or more broadcast transmitters 304.

The broadcast transmitter 304 can be configured in a number of ways. For example, the broadcast transmitter 304 can broadcast over a region and can filter only content/messages from the multiplexer 302 that apply to the specific region related to the broadcast transmitter 304. In another example, the broadcast transmitter 304 can transmit substantially all content/messages received from the multiplexer 302 (e.g., where the multiplexer 302 selects regions by choosing the broadcast transmitter 304 in the first place). In either case, the broadcast transmitter 304 broadcasts content and/or messages that can be received by the wireless device 306. The wireless device 306 can comprise an application 314 that can receive the content and/or messages, a broadcast data stack 316 that can queue content and/or messages received from the broadcast transmitter 304, a message detector 318 that can detect presence of a message on the broadcast data stack 316, and a message analyzer 320 that can evaluate the message to determine relevancy to the wireless device 306 and/or application 314 executing thereon, as described.

According to an example, the data receiver 308 can receive a message or alert for broadcasting to one or more devices from one or more sources. As described, the message can be an emergency or amber alert, a venue specific message, and/or substantially any general or specific broadcast message. Additionally, the message source can be a manual source, such as a network operator, and/or automatically generated, such as by an amber alert or other system. Once the data is received, the message constructor 310 can create a message for transmission over a broadcast network. In addition, the message constructor 310 can increment a control channel sequence number or otherwise indicate subsequent broadcast of the message, as described. The message can include not only the appropriate content, but also metrics related to the message, such as a type, size, region, and/or the like to facilitate efficient analysis of the message upon receipt, as well as a start/end time for message transmission. In one example, the message constructor 310 can form the message to a type defined in the system 300 (such as a MediaFLO specification)

The message broadcaster 312 can transmit the message to the broadcast transmitter 304 for broadcasting thereof to a plurality of wireless devices. In one example, the message broadcaster 312 can select one or more broadcast transmitters for broadcasting the message based at least in part on a region desired for the message (e.g., specified in the message data). Additionally, the message can be broadcast over a control channel by the broadcast transmitter 304, for example, allowing continuous broadcast of the message throughout the specified time period (e.g. start time to end time). In one example, the broadcast transmitter 304 can filter messages received from the multiplexer 302 by region or other value and/or the wireless device 306 can perform such filtering. The wireless device 306 can receive the message on its broadcast data stack 316 regardless of whether the wireless device 306 is receiving other content (such as media) from the broadcast transmitter 304. Periodically, the message detector 318 can determine the existence of a message on the stack. This can be performed, for example, by checking a control channel for an incremented sequence number, as described. It is to be appreciated that other mechanisms can be utilized to determine whether a message is present, such as detecting presence of a value or receiving notice of a message from a disparate device, for example.

The message analyzer 320 can determine whether the message is relevant to the wireless device 306 or application 314. For example, the message analyzer 320 can evaluate a message type, subject, content, region, etc.; if the wireless device 306 has specified not to present such messages, the message analyzer 320 can disregard the message. Where the wireless device 306 and/or application 314 desires to receive the message, the message analyzer 320 can present the message for propagation and/or notification to the user. The application 314, for example, can be substantially any type of presentation application, such as an SMS application, a service, and/or the like. According to an example, the application 314 can be an emergency alert service that executes on the wireless device 306 for presenting and/or notifying a user of emergency or amber alert messages. Thus, upon the message detector 318 detecting presence of a message on the broadcast stack 316 and the message analyzer 320 determining the message to be an emergency alert, the message can be forwarded to the application 314 to notify the user of the emergency (this can further be based on a region code in the message). In one example, the application 314 can alert the message over other executing applications, depending on urgency.

Additionally, as described, the message can comprise text as well as links to content and/or links to purchase a fixed, perpetual, pay-per-view, etc., content subscription. In one example, the message can comprise a text alert along with a link for more information. The link can allow purchase of additional content, which can be content transmitted over the broadcast network including mobile TV, other video clips, audio, applications (such as a statistics tracker and/or other data feeds, etc.) and/or the like. The content can be purchased using a bidirectional wireless network (such as a 3G network) as shown in reference to previous figures—the network can facilitate the purchase transaction including updating a content policy related to wireless device 306. As mentioned, the wireless device 306 can receive substantially all media transmitted by the broadcast transmitter 304, but only decode content according to its content policy or where the content is one or more types of a broadcast message (such as an emergency message).

In one example, the system 300 can operate in a MediaFLO network as described where the multiplexer 302 can receive information from an NOC that is global, national, regional, etc. Moreover, in this example, the broadcast transmitter 304 can operate in a MFTS to deliver media content to a plurality of wireless devices, like wireless device 306. As described, the wireless devices can be equipped to receive broadcast media content from the broadcast transmitter 304; however, a content policy related to the wireless device 306 can control which content the wireless device 306 can decode and forward to application 314 for presentation to a user of the wireless device 306. However, in one example, the broadcast messaging functionality can operate independently of content delivery as described. Thus, the broadcast data stack 316, which can be a MediaFLO data stack, can queue messages received from the broadcast transmitter 304. The messages can be detected by the message detector 318, evaluated by the message analyzer 320, and forwarded to application 314, if relevant, as described herein.

In the MediaFLO example implementation, the message can conform to a FLO messaging service (FMS) specification. In one example, the FMS message can be a control protocol packet (CPP), allowing continual transmission during a time period, having a specified message type identifier. For instance, the identifier can indicate an emergency message, event message, general message, service provider message, etc. Using such a type can allow the message analyzer 320 to filter messages according to type (e.g., according to user preference). In addition, the FMS message can be defined in a type, length, value (TLV) format to allow support for different message types/extensions. An example message format that the multiplexer 302 can conform the message to can be the following:

| Message Type | 8 |
|---|---|
| Message Sequence Number | 16 |
| LOI Count | 8 |

| LOI instances based on LOI count | |
|---|---|
| LOI ID | 16 |
| Length | 16 |
| Data | Variable |

The numbers above refer to a number of bits for the message values; thus, message type can be an 8-bit value that identifies a type of message, the message sequence number can be a 16-bit value that is incremented for a new message (when the 16-bit boundary is reached, the number can roll to 0, in one example), and a location operations infrastructure (LOI) count that can be an 8-bit value for specifying a number of LOI instances to follow. The LOI instances can each have additional fields including an LOI ID, which can be a 16-bit value identifying an appropriate LOI for receiving the message, a length of the message, which can also be 16-bit, and a variable length data field for message contents. In addition as described, the FMS message can be transmitted as a CPP.

Thus, the multiplexer 302 can further wrap the FMS in a CPP structure that can be similar to the following, in one example:

| Fill | 0 |
|---|---|
| MessageTypeID | 8 |
| Bin ID | 1 |
| CPP Number | 8 |
| TotalCPPCount | 8 |
| NumPadBytes | 7 |
| FMS Message | Variable |

Thus, the FMS messages structure shown above can be placed in the variable FMS message value. The message analyzer 320 can interpret the CPP, extracting the message to determine relevancy of the message to the wireless device 306, for example, based on one or more values of the FMS and/or CPP structure. Additionally, transmitting the FMS as a CPP can mean that the FMS is transmitted in substantially every superframe from start time to end time; additionally, it can be transmitted with other CPP data as well.

Figure 4:
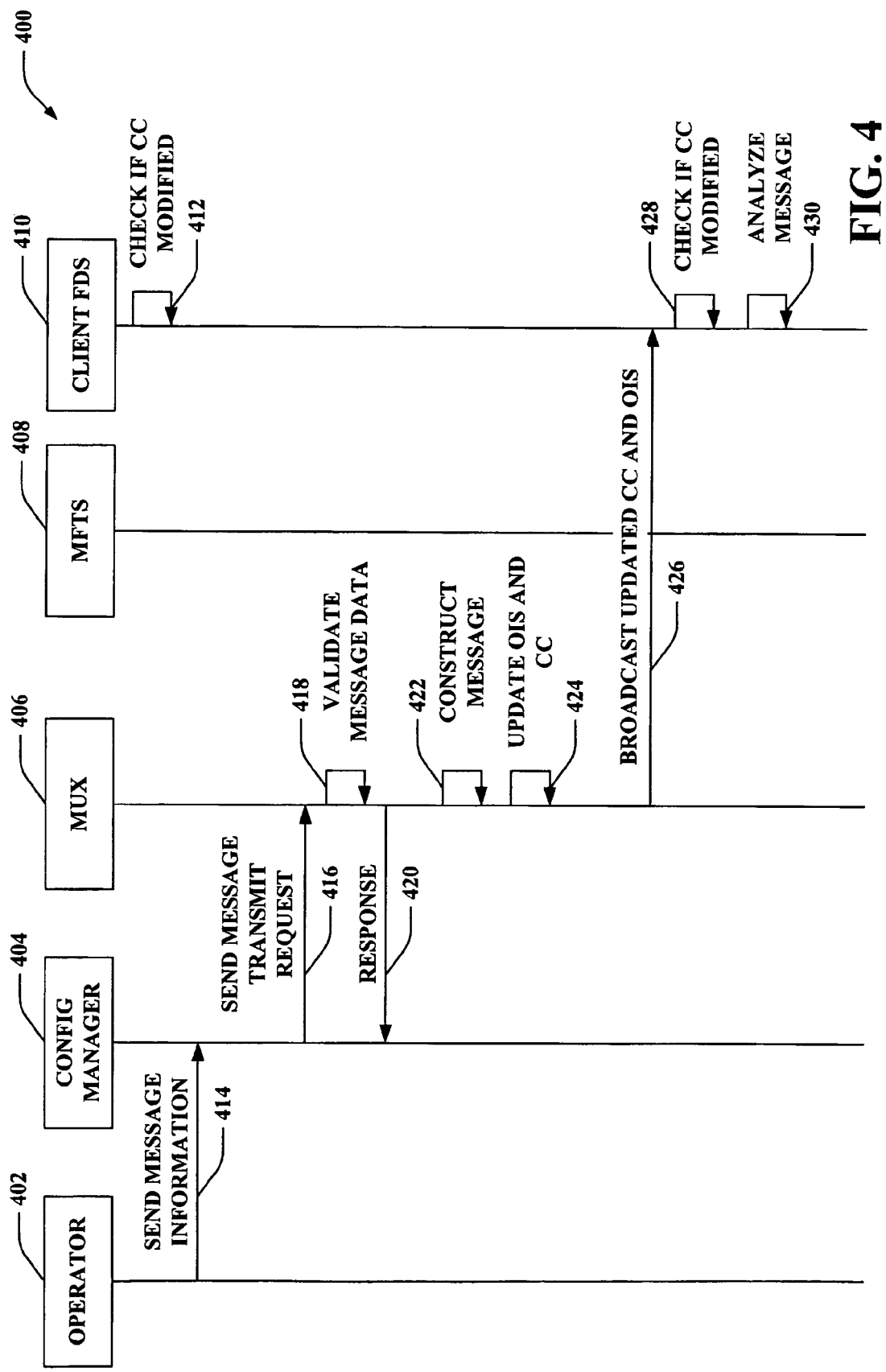
FIG. 4 is an illustration of an example MediaFLO implementation utilizing aspects described herein.

Turning now to FIG. 4, illustrated is an example Media-FLO broadcast network messaging system 400 that facilitates broadcasting messages over the media content network. An operator 402 is provided that can be a manual or automatic initial injector of data into the broadcast network, a configuration manager 404 that receives the data from the operator and provisions the data for further processing, a multiplexer 406 that receives the provisioned data and creates a message for broadcast to a number of mobile devices, an MFTS 408 that broadcasts the message, and a client flow data stack 410 that can be present in mobile devices equipped to receive MediaFLO content. It is to be appreciated, as described, that though shown as individual components, each component can exist in multiple form and/or version. For example, the multiplexer 406 can transmit content and messages for broadcast to a plurality of MFTS 408, which each can broadcast content and messages to a plurality of client flow data stacks 410 on a plurality of mobile devices.

As described previously, the client flow data stack 410 can be monitored for change indicative of a new message. At 412, the client flow data stack 410 checks to see if a control channel is modified—modification of the control channel can indicate existence of a new message. However, there is no new message as shown so the client flow data stack 410 suspends (e.g., for a monitor period) continuing to monitor the control channel. At 414, the operator 402 provisions message data at the configuration manager 404; the data can include a start and end time for the broadcast, local or regional markets to receive the message, and/or the like. As described, the operator 402 can be an entity that inputs messages upon occurrence of notification. In addition, the operator 402 can be an amber alert or other emergency system in communication with the MediaFLO network via configuration manager 404. At 416, the configuration manager can transmit a request for sending the message to the multiplexer 406. Upon receipt, the multiplexer 406 can validate the message data at 418 to ensure it conforms to a specification type, for example. Subsequently, the multiplexer 406 can transmit a response 420 to the configuration manager (e.g., indicating success or error code).

At 422, the multiplexer 406 can construct a message based on the message received from the configuration manager 404, which can identify a wide-area multiplex (e.g., one or more MFTS that should receive the message) as well as one or more local-area markets for which the message is targeted. At 424, the multiplexer 406 can increment a sequence number in OIS of a control channel and update the control channel with the message. At 426, the multiplexer 406 can broadcast the updated control channel and OIS utilizing the MFTS 408. At 428, the client flow data stack 410 again checks for modified control channel. At this point, the control channel has been modified with the broadcast message, and the client flow data stack 410, or monitoring application, can detect this by determining an increment in the sequence number of the OIS related to the control channel.

At 430, the message can be accordingly processed. This can include evaluating a message type, subject, content, regional identification, etc. to determine a relevancy of the message to the mobile device comprising the flow data stack 410. Thus, for example, if the message applies to regions outside of that of the mobile device, the message on the respective client flow data stack 410 can be discarded. If the message is relevant, the message from the client flow data stack 410 can be forwarded to an application of the mobile device for presentation/notification to a user or other utilizations as described herein. In one example, the message can be an emergency alert message. The mobile device can execute an emergency alert service for receiving and processing such messages. Upon transmitting the emergency message as described, the mobile device can detect the message presence based on evaluating the control channel and/or OIS related thereto, as shown at 428. The message is analyzed at 430 to determine if the emergency alert relates to an area in which the mobile device is stationed. This can be based at least in part on a matching LOI identifier and/or wide-area multiplex identifier in the alert message and mobile device. If so, the alert message can be forwarded from its client flow data stack 410 to an alert presentation/notification service on the device, for example. This can occur regardless of whether the client FDS 410 is receiving other media content from the MediaFLO network (e.g., based at least in part on its content policy).

Figure 5:
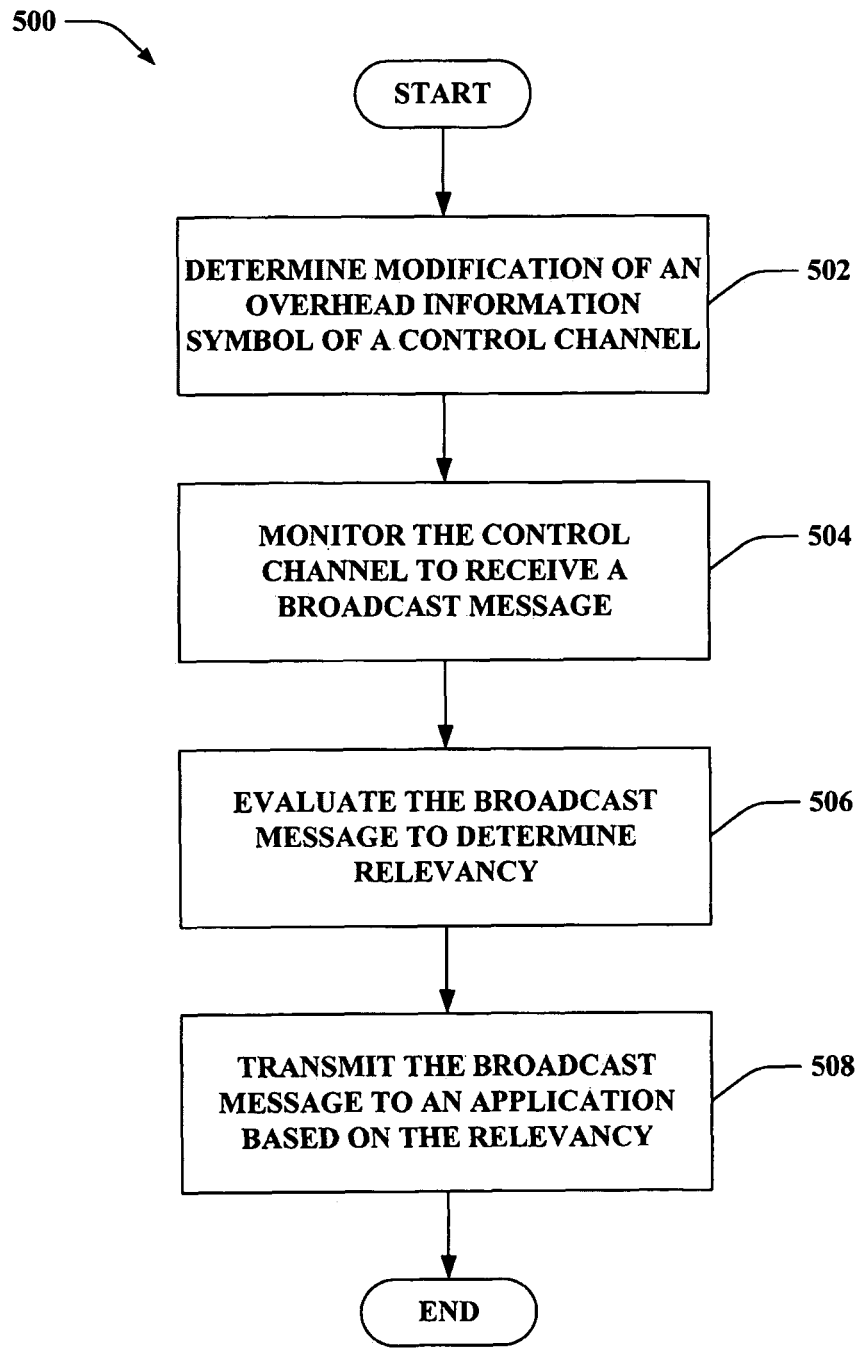
FIG. 5 is an illustration of an example methodology that facilitates receiving broadcast messages in a wireless media broadcast network.
Figure 6:
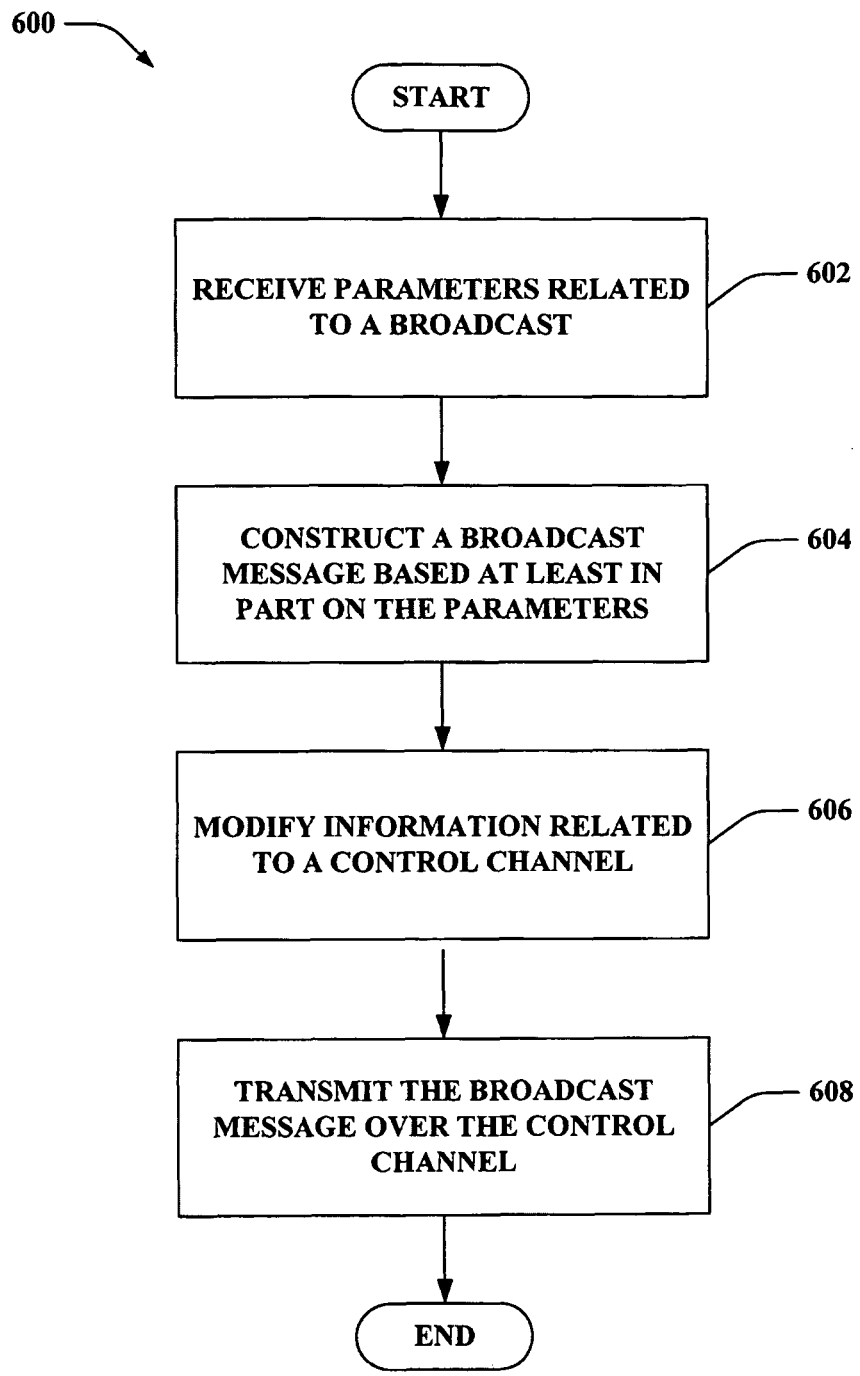
FIG. 6 is an illustration of an example methodology that facilitates broadcasting messages in a wireless media broadcast network.

Referring to FIGS. 5-6, methodologies relating to receiving and broadcasting messages over a wireless media broadcast network are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Turning to FIG. 5, a methodology 500 that facilitates receiving and processing broadcast messages in a wireless media broadcast network is displayed. At 502, modification of an OIS of a control channel can be determined. For example, this can include an incremented sequence number, as described previously. The OIS can be modified by a transmitter of a broadcast message to indicate subsequent broadcast of a broadcast message over the network. At 504, the control channel can be monitored to receive a broadcast message. As described, the monitoring can include evaluating a data stack, which can additionally receive media content over the broadcast network, for the message. At 506, the broadcast message can be evaluated to determine relevancy. This can include analyzing one or more parameters or content of the message, such as a region, title, subject, etc. to determine whether the message applies to an application or user, for example. At 508, the broadcast message can be transmitted to an application based on the relevancy. In one example, as described, the broadcast message can be an emergency message, which can be relevant to substantially all devices in a region of the alert. Thus, so long as the message is relevant to the region, it can be transmitted to an application for prompt presentation/notification to a user, for example.

Turning to FIG. 6, illustrated is a methodology 600 that facilitates broadcasting messages over a wireless media broadcast network. At 602, parameters can be received related to a broadcast. According to an example, the parameters can include one or more of a message content, message subject, message type, start time for transmission, end time for transmission, a region to receive the message, and/or the like. At 604, a broadcast message is constructed based at least in part on the parameters. Thus, the broadcast message can specify content, a message type, start/end time, region code, and/or the like. At 606, information related to a control channel can be modified to indicate subsequent broadcast of the broadcast message. At 608, the broadcast message can be transmitted over the control channel. In one example, as described, the broadcast message can be transmitted to one or more broadcast transmitters for regional broadcast to a plurality of mobile devices. The broadcast transmitters can be selected based at least on part on the region code in the received broadcast parameters. Additionally or alternatively, the broadcast message can specify a region code for more granular filtering by mobile devices as described.

It will be appreciated that, in accordance with one or more aspects described herein, inferences can be made regarding determining presence of a broadcast message, message type, region, and/or the like as described. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. In one example, inferences can be made in determining relevancy of a message to a mobile device based on one or more message parameters as well as parameters of a mobile device and/or a content policy related thereto.

Figure 7:
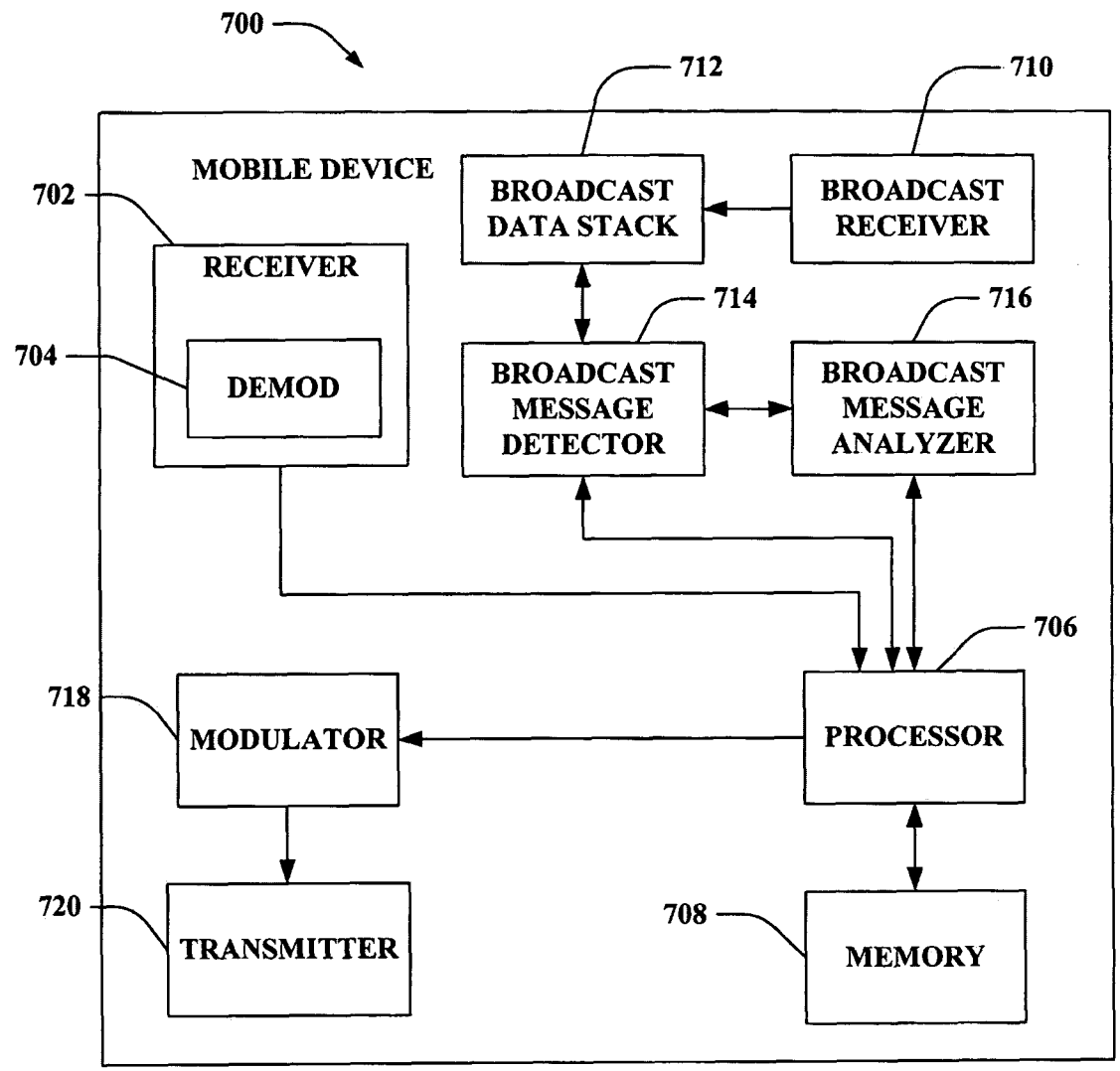
FIG. 7 is an illustration of an example mobile device that facilitates receiving and processing broadcast messages in a wireless media broadcast network.

FIG. 7 is an illustration of a mobile device 700 that facilitates receiving and processing messages received over a wireless broadcast network. Mobile device 700 comprises a receiver 702 that receives a signal from, for instance, a receive antenna (not shown), performs typical actions on (e.g., filters, amplifies, downconverts, etc.) the received signal, and digitizes the conditioned signal to obtain samples. Receiver 702 can comprise a demodulator 704 that can demodulate received symbols and provide them to a processor 706 for channel estimation. Processor 706 can be a processor dedicated to analyzing information received by receiver 702 and/or generating information for transmission by a transmitter 720, a processor that controls one or more components of mobile device 700, and/or a processor that both analyzes information received by receiver 702, generates information for transmission by transmitter 720, and controls one or more components of mobile device 700.

Mobile device 700 can additionally comprise memory 708 that is operatively coupled to processor 706 and that can store data to be transmitted, received data, information related to available channels, data associated with analyzed signal and/or interference strength, information related to an assigned channel, power, rate, or the like, and any other suitable information for estimating a channel and communicating via the channel. Memory 708 can additionally store protocols and/or algorithms associated with estimating and/or utilizing a channel (e.g., performance based, capacity based, etc.).

It will be appreciated that the data store (e.g., memory 708) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 708 of the subject systems and methods is intended to comprise, without being limited to, these and any other suitable types of memory.

Mobile device 700 can further comprise a broadcast receiver 710 that can receive media content over a wireless broadcast network, such as mobile TV, other video media, audio media, and/or the like. The broadcast receiver 710 can be further coupled to a broadcast data stack 712 that receives content data and queues the data for subsequent determination of whether the data can be presented to a user of the mobile device 700—this can be based on a content policy, as described. In addition, the broadcast data stack 712 can be coupled to a broadcast message detector 714 that can determine presence of a broadcast message on the broadcast data stack 712. As described, messages can be received in addition to content over the broadcast network for efficient regional broadcast thereof. The broadcast message detector 714 can detect the message, in one example, by monitoring a value related to a control channel over which data is received; upon modification (e.g., increment) of the value, a broadcast message analyzer 716 can evaluate parameters of the message to determine relevancy to the mobile device 700. For example, parameters can relate to a region, subject, title, content, etc.

In one example, as described, the message can relate to an emergency and can originate from an emergency/amber alert system. The message can be received via the broadcast receiver 710 and pushed onto the broadcast data stack 712. The broadcast message detector 714 can detect existence of the message based on a modified control channel value. Subsequently, the broadcast message analyzer 716 can evaluate the message to determine whether it should be presented to a user of the mobile device 700, for example. Mobile device 700 still further comprises a modulator 718 and transmitter 720 that respectively modulate and transmit signals to, for instance, a base station, another mobile device, etc. This can operate as part of a disparate bidirectional wireless network utilized to communicate non-broadcast information (such as content policy modifications, etc.) Although depicted as being separate from the processor 706, it is to be appreciated that the broadcast message detector 714, broadcast message analyzer 716, demodulator 704, and/or modulator 718 can be part of the processor 706 or multiple processors (not shown).

Figure 8:
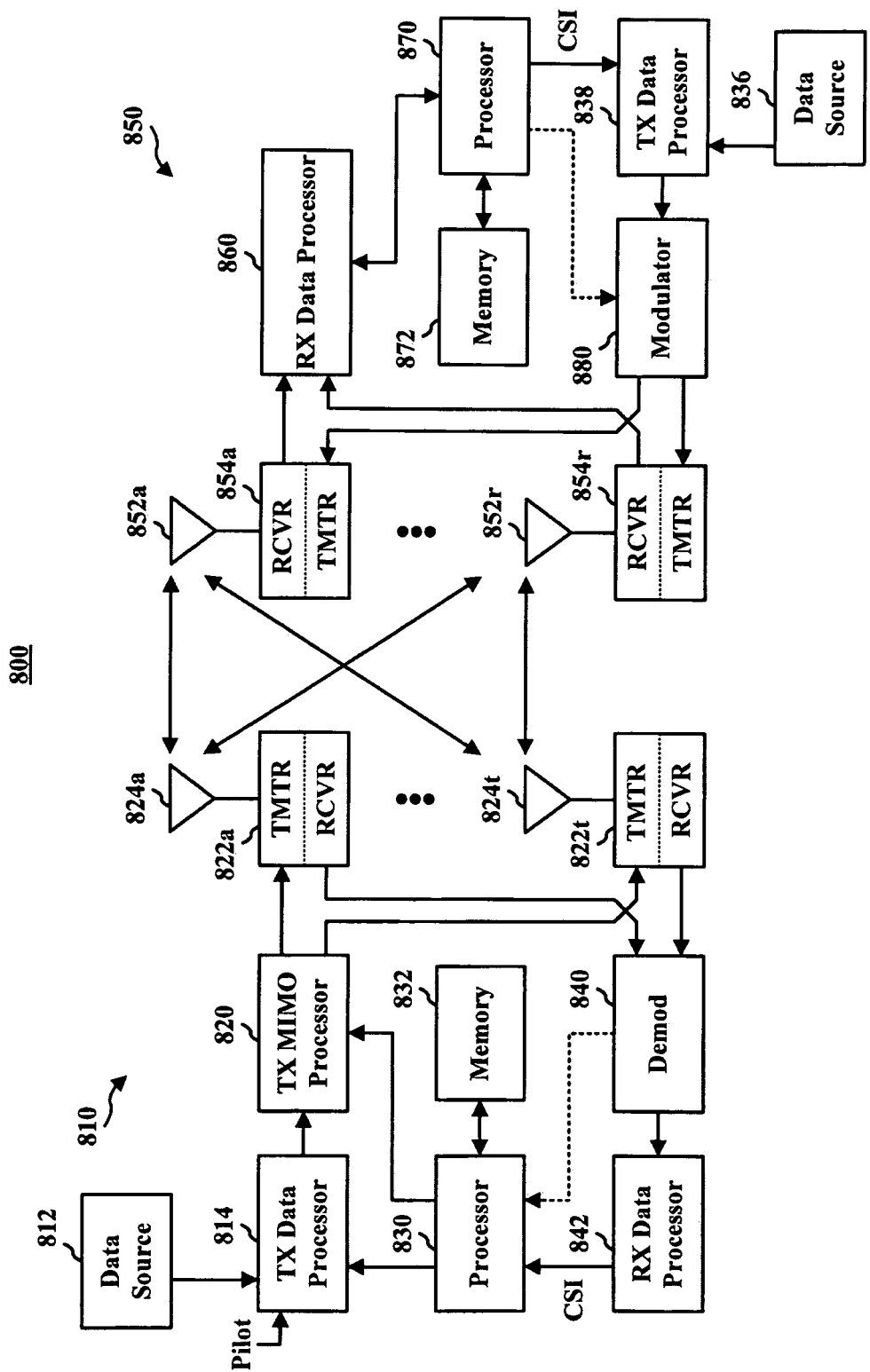
FIG. 8 is an illustration of an example wireless network environment that can be employed in conjunction with the various systems and methods described herein.

FIG. 8 shows an example wireless communication system 800. The wireless communication system 800 depicts one base station/broadcast transmitter 810 and one mobile device 850 for sake of brevity. However, it is to be appreciated that system 800 can include more than one base station/broadcast transmitter and/or more than one mobile device, wherein additional base stations/transmitters and/or mobile devices can be substantially similar or different from example base station/broadcast transmitters 810 and mobile device 850 described below. In addition, it is to be appreciated that base station/broadcast transmitter 810 and/or mobile device 850 can employ the systems (FIGS. 1-3 and 7-8), configurations (FIG. 4), and/or methods (FIGS. 5-6) described herein to facilitate wireless communication there between.

At base station/broadcast transmitter 810, traffic data for a number of data streams is provided from a data source 812 to a transmit (TX) data processor 814. According to an example, each data stream can be transmitted over a respective antenna. TX data processor 814 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 850 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 830.

The modulation symbols for the data streams can be provided to a TX MIMO processor 820, which can further process the modulation symbols (e.g., for OFDM). TX MIMO processor 820 then provides $N_T$ modulation symbol streams to $N_T$ transmitters (TMTR) 822a through 822t. In various embodiments, TX MIMO processor 820 applies beamforming weights to the symbols of the data streams and to the antenna from which the symbol is being transmitted.

Each transmitter 822 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 822a through 822t are transmitted from $N_T$ antennas 824a through 824t, respectively.

At mobile device 850, the transmitted modulated signals are received by $N_R$ antennas 852a through 852r and the received signal from each antenna 852 is provided to a respective receiver (RCVR) 854a through 854r. Each receiver 854 conditions (e.g., filters, amplifies, and downconverts) a respective signal, digitizes the conditioned signal to provide samples, and further processes the samples to provide a corresponding "received" symbol stream.

An RX data processor 860 can receive and process the $N_R$ received symbol streams from $N_R$ receivers 854 based on a particular receiver processing technique to provide $N_T$ "detected" symbol streams. RX data processor 860 can demodulate, deinterleave, and decode each detected symbol stream to recover the traffic data for the data stream. The processing by RX data processor 860 is complementary to that performed by TX MIMO processor 820 and TX data processor 814 at base station/broadcast transmitter 810.

A processor 870 can periodically determine which precoding matrix to utilize as discussed above. Further, processor 870 can formulate a reverse link message comprising a matrix index portion and a rank value portion.

The reverse link message can comprise various types of information regarding the communication link and/or the received data stream. The reverse link message can be processed by a TX data processor 838, which also receives traffic data for a number of data streams from a data source 836, modulated by a modulator 880, conditioned by transmitters 854a through 854r, and transmitted back to base station/broadcast transmitter 810.

At base broadcast transmitter 810, the modulated signals from mobile device 850 can be received by antennas 824, conditioned by receivers 822, demodulated by a demodulator 840, and processed by a RX data processor 842 to extract the reverse link message transmitted by mobile device 850. Further, processor 830 can process the extracted message to determine which precoding matrix to use for determining the beamforming weights. It is to be appreciated that in the case of a broadcast 810, as opposed to a base station, these RX components may not be present.

Processors 830 and 870 can direct (e.g., control, coordinate, manage, etc.) operation at base broadcast transmitter 810 and mobile device 850, respectively. Respective processors 830 and 870 can be associated with memory 832 and 872 that store program codes and data. Processors 830 and 870 can also perform computations to derive frequency and impulse response estimates for the uplink and downlink, respectively.

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 9:
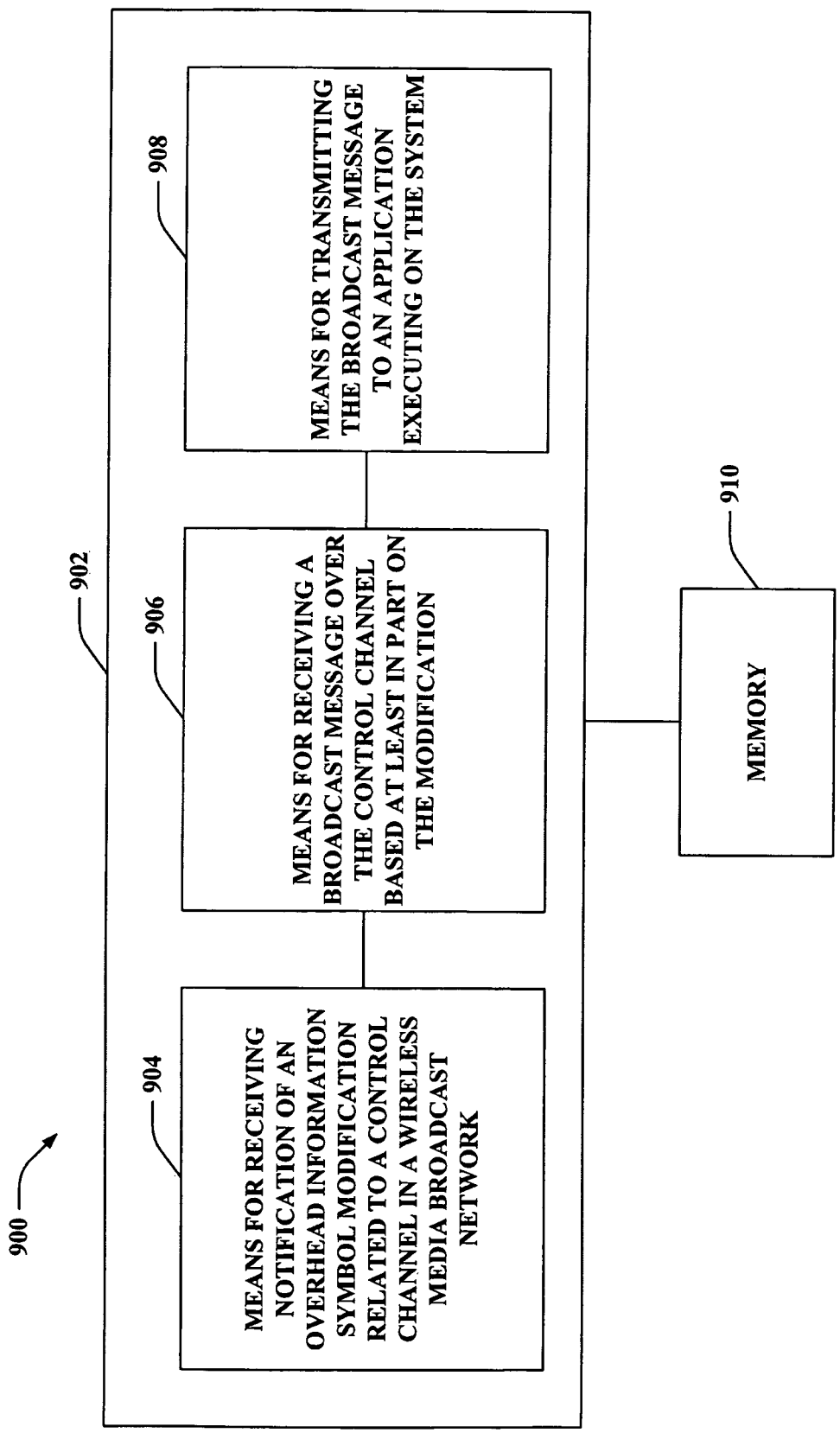
FIG. 9 is an illustration of an example system that receives and processes wireless broadcast messages.

With reference to FIG. 9, illustrated is a system 900 that receives and processes messages received over a wireless media broadcast network. For example, system 900 can reside at least partially within a transmitter, mobile device, etc. It is to be appreciated that system 900 is represented as including functional blocks, which can be functional blocks that represent functions implemented by a processor, software, or combination thereof (e.g., firmware). System 900 includes a logical grouping 902 of electrical components that can act in conjunction. For instance, logical grouping 902 can include means for receiving notification of an OIS modification related to a control channel in a wireless media broadcast network 904. For example, the OIS modification can include incrementing a sequence number related to the control channel or other mechanisms for notifying of message presence. In this regard, the system 902 can save power by monitoring a single variable for change before receiving data related thereto.

Further, logical grouping 902 can comprise means for receiving a broadcast message over the control channel based at least in part on the modification 906. Thus, as described, upon determining existence of the message, the message can be received for subsequent processing. Furthermore, logical grouping 902 can comprise means for transmitting the broadcast message to an application executing on the system 908. In this regard, if the broadcast message is relevant (e.g., related to a region and/or desired content of the system 900 or user thereof), it can be presented for subsequent propagation to a user. Additionally, system 900 can include a memory 910 that retains instructions for executing functions associated with electrical components 904, 906, and 908. While shown as being external to memory 910, it is to be understood that one or more of electrical components 904, 906, and 908 can exist within memory 910.

Figure 10:
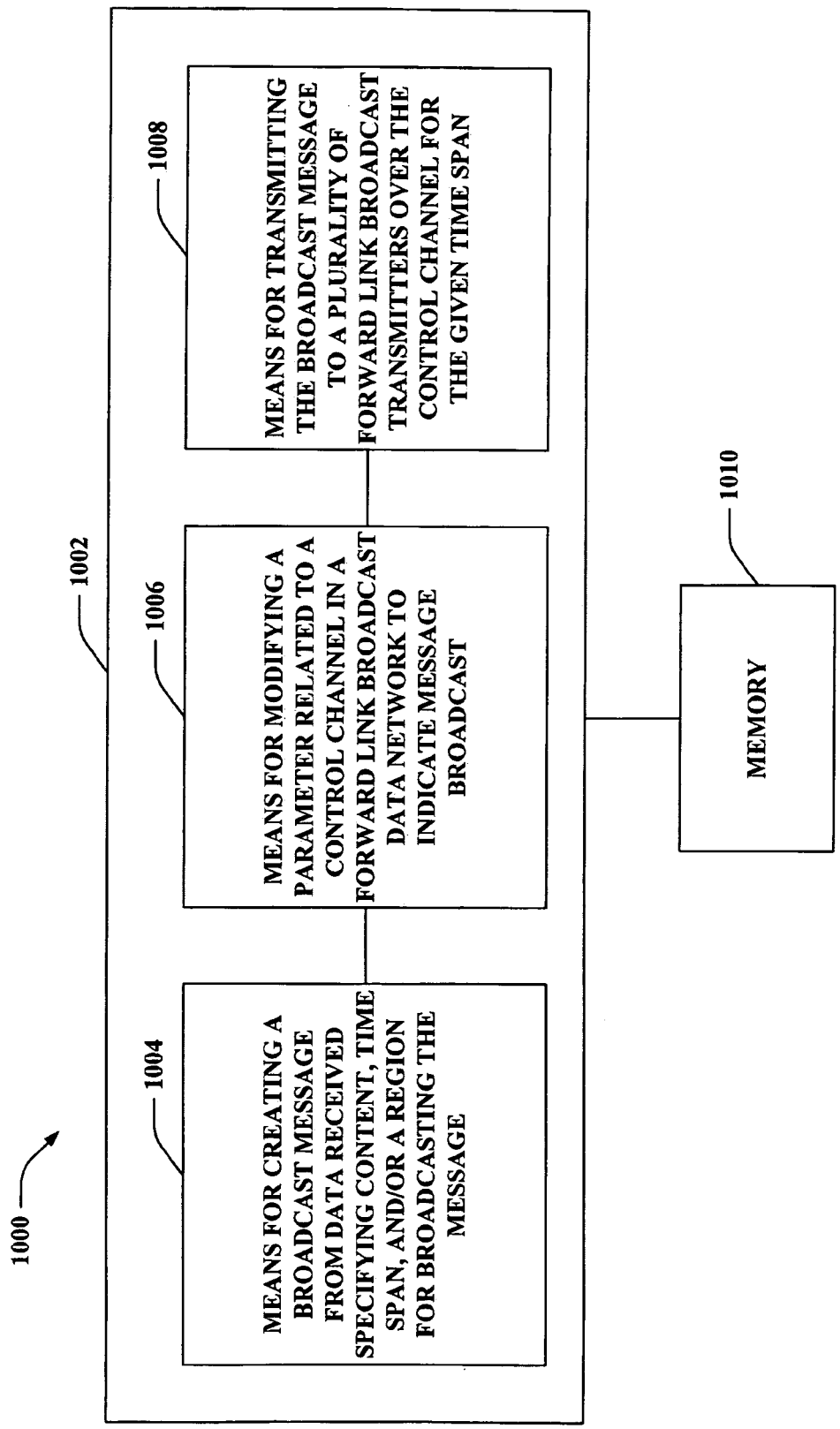
FIG. 10 is an illustration of an example system that broadcasts messages over a wireless media broadcast network.

Turning to FIG. 10, illustrated is a system 1000 that broadcasts messages in a wireless media broadcast network. System 1000 can reside within a multiplexer, transmitter, mobile device, etc., for instance. As depicted, system 1000 includes functional blocks that can represent functions implemented by a processor, software, or combination thereof (e.g., firmware). System 1000 includes a logical grouping 1002 of electrical components that facilitate broadcasting messages. Logical grouping 1002 can include means for creating a broadcast message from data received specifying content, time span, and/or region for broadcasting the message 1004. In this regard, messages can be targeted to specific regions as described herein. Moreover, logical grouping 1002 can include means for modifying a parameter related to a control channel in a broadcast network to indicate message broadcast 1006. Thus, devices receiving the content can efficiently determine existence of the message based on the modified parameter. Furthermore, logical grouping 1002 can include means for transmitting the broadcast message to a plurality of broadcast transmitters over the control channel for the given time span 1008. Selection of the transmitters can relate to the specified region, for example. Additionally, system 1000 can include a memory 1010 that retains instructions for executing functions associated with electrical components 1004, 1006, and 1008. While shown as being external to memory 1010, it is to be understood that electrical components 1004, 1006, and 1008 can exist within memory 1010.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

What is claimed is:

1. A method for receiving broadcast messages over a wireless broadcast network, comprising:
    detecting, on a mobile device, a modification of an overhead information symbol for a control channel in a wireless broadcast network;
    monitoring the control channel from the mobile device based at least in part on the detected modification to receive a broadcast message; and
    forwarding the broadcast message to an application executing on the mobile device.

2. The method of claim 1, further comprising receiving media content over a disparate channel of the wireless broadcast network.

3. The method of claim 2, further comprising processing the media content based at least in part on a content policy accessible from a disparate network.

4. The method of claim 2, wherein the broadcast message comprises a link for purchasing receipt of the media content over the wireless broadcast network.

5. The method of claim 1, wherein the broadcast message is an emergency alert message.

6. The method of claim 5, wherein the application interrupts a disparate application to display the emergency alert message.

7. The method of claim 5, further comprising analyzing a region specified in the emergency alert message to ensure applicability to the mobile device.

8. The method of claim 1, further comprising suspending control channel monitoring until a subsequent modification is detected of the overhead information symbol.

9. The method of claim 1, wherein the modification includes incrementing a sequence number overhead information symbol related to the control channel.

10. A computer program product, comprising:
    a non-transitory computer-readable medium having computer readable instructions stored thereon, the instructions being executable by a computing device to perform acts comprising:
        causing at least one computer to detect a modification of an overhead information symbol for a control channel in a wireless broadcast network;
        causing the at least one computer to monitor the control channel based at least in part on the detected modification to receive a broadcast message; and
        causing the at least one computer to forward the broadcast message to an application.

11. The computer program product of claim 10, the instructions being executable by a computing device to perform acts further comprising:
    causing the at least one computer to receive media content over a disparate channel of the wireless broadcast network.

12. The computer program product of claim 11, the instructions being executable by a computing device to perform acts further comprising:
    causing the at least one computer to process the media content based at least in part on a content policy accessible from a disparate network.

13. The computer program product of claim 11, wherein the broadcast message comprises a link for purchasing receipt of the media content over the wireless broadcast network.

14. The computer program product of claim 10, wherein the broadcast message is an emergency alert message.

15. The computer program product of claim 14, wherein the application interrupts a disparate application to display the emergency alert message.

16. The computer program product of claim 14, the instructions being executable by a computing device to perform acts further comprising:
    causing the at least one computer to analyze a region specified in the emergency alert message to ensure applicability to the mobile device.

17. The computer program product of claim 10, the instructions being executable by a computing device to perform acts further comprising:
    causing the at least one computer to suspend control channel monitoring until a subsequent modification is detected of the overhead information symbol.

18. The computer program product of claim 10, wherein the modification includes incrementing a sequence number overhead information symbol related to the control channel.

19. A wireless communications apparatus, comprising:
    at least one processor configured to:
        create a broadcast message comprising received parameters corresponding to message content, a start time and end time for broadcasting, and a region to receive the broadcast message;
        increment a sequence number related to a control channel to indicate subsequent broadcast of the broadcast message;
        select one or more broadcast transmitters for broadcasting the broadcast message based at least in part on the region; and
        transmit the broadcast message over the control channel to the broadcast transmitters between the start time and the end time; and
    a memory coupled to the at least one processor.

20. A wireless communications apparatus for broadcasting messages over a wireless media broadcast network, comprising:
    multiplexer means for creating a broadcast message from data received specifying content, time span, and/or a region for broadcasting the message;
    multiplexer means for modifying a parameter related to a control channel in a broadcast network to indicate message broadcast; and
    multiplexer means for transmitting the broadcast message to a plurality of broadcast transmitters over the control channel for the given time span.

21. A computer program product, comprising:
    a non-transitory computer-readable medium having computer readable instructions stored thereon, the instructions being executable by a computing device to perform acts comprising:
        causing at least one computer to construct a broadcast message based at least in part on received message data and a time span for broadcasting the message;

causing the at least one computer to modify one or more overhead information symbols related to a control channel; and causing the at least one computer to transmit the broadcast message over the control channel for the time span to one or more broadcast transmitters for subsequent broadcast to a plurality of mobile devices.

22. An apparatus, comprising:
a data receiver that obtains parameters for broadcasting a message in a wireless media broadcast network;
a message constructor that generates a broadcast message based at least in part on the obtained parameters and modifies information related to a control channel to indicate broadcast of the broadcast message; and
a message broadcaster that transmits the broadcast message to one or more broadcast transmitters for propagation to a plurality of mobile devices.

23. The apparatus of claim 22, wherein the message broadcaster selects the one or more broadcast transmitters based at least in part on a region parameter specified in the parameters.

24. The apparatus of claim 22, wherein the message constructor specifies a message type in the generated broadcast message.

25. The apparatus of claim 24, wherein the message type corresponds to an emergency alert and the parameters are obtained from an emergency alert system.

26. The apparatus of claim 22, wherein the message broadcaster additionally transmits media content to the one or more broadcast transmitters for broadcast to the one or more mobile devices.

27. The apparatus of claim 26, wherein the parameters comprise a link to receive the media content.

28. The apparatus of claim 22, wherein the modified information includes incrementing a sequence number related to the control channel.

29. A method for broadcasting messages over a wireless media broadcast network, the method comprising:
creating a broadcast message from data received specifying content, time span, and/or a region for broadcasting the message;
modifying a parameter related to a control channel in a broadcast network to indicate message broadcast; and
transmitting the broadcast message to a plurality of broadcast transmitters over the control channel for the given time span.

30. An apparatus, comprising:
multiplexer means for obtaining parameters for broadcasting a message in a wireless media broadcast network;
multiplexer means for generating a broadcast message based at least in part on the obtained parameters and modifying information related to a control channel to indicate broadcast of the broadcast message; and
multiplexer means for transmitting the broadcast message to one or more broadcast transmitters for propagation to a plurality of mobile devices.

31. The apparatus of claim 30, wherein the means for transmitting the broadcast message further comprises means for selecting the one or more broadcast transmitters based at least in part on a region parameter specified in the parameters.

32. The apparatus of claim 30, wherein the means for generating a broadcast message further comprise means for specifying a message type in the generated broadcast message.

33. The apparatus of claim 32, wherein the message type corresponds to an emergency alert and the parameters are obtained from an emergency alert system.

34. The apparatus of claim 30, wherein the means for transmitting the broadcast message further comprises means for additionally transmitting media content to the one or more broadcast transmitters for broadcast to the one or more mobile devices.

35. The apparatus of claim 34, wherein the parameters comprise a link to receive the media content.

36. The apparatus of claim 30, wherein the modified information includes incrementing a sequence number related to the control channel.

37. A computer program product, comprising:
a non-transitory computer-readable medium having computer readable instructions stored thereon, the instructions being executable by a computing device to perform acts comprising:
causing at least one computer to obtain parameters for broadcasting a message in a wireless media broadcast network;
causing the at least one computer to generate a broadcast message based at least in part on the obtained parameters and modify information related to a control channel to indicate broadcast of the broadcast message; and
causing the at least one computer to transmit the broadcast message to one or more broadcast transmitters for propagation to a plurality of mobile devices.

38. The computer program product of claim 37, the instructions being executable by a computing device to perform acts further comprising:
causing the at least one computer to select the one or more broadcast transmitters based at least in part on a region parameter specified in the parameters.

39. The computer program product of claim 37, the instructions being executable by a computing device to perform acts further comprising:
causing the at least one computer to specify a message type in the generated broadcast message.

40. The computer program product of claim 39, wherein the message type corresponds to an emergency alert and the parameters are obtained from an emergency alert system.

41. The computer program product of claim 37, the instructions being executable by a computing device to perform acts further comprising:
causing the at least one computer to additionally transmit media content to the one or more broadcast transmitters for broadcast to the one or more mobile devices.

42. The computer program product of claim 41, wherein the parameters comprise a link to receive the media content.

43. The computer program product of claim 37, wherein the modified information includes incrementing a sequence number related to the control channel.

44. A method, comprising:
obtaining parameters for broadcasting a message in a wireless media broadcast network;
generating a broadcast message based at least in part on the obtained parameters and modifying information related to a control channel to indicate broadcast of the broadcast message; and
transmitting the broadcast message to one or more broadcast transmitters for propagation to a plurality of mobile devices.

45. The method of claim 44, wherein the transmitting the broadcast message further comprises selecting the one or more broadcast transmitters based at least in part on a region parameter specified in the parameters.

46. The method of claim 44, wherein the generating a broadcast message further comprise specifying a message type in the generated broadcast message.

47. The method of claim 46, wherein the message type corresponds to an emergency alert and the parameters are obtained from an emergency alert system.

48. The method of claim 44, wherein the transmitting the broadcast message further comprises additionally transmitting media content to the one or more broadcast transmitters for broadcast to the one or more mobile devices.

49. The method of claim 48, wherein the parameters comprise a link to receive the media content.

50. The method of claim 44, wherein the modified information includes incrementing a sequence number related to the control channel.

51. A method for receiving broadcast messages over a wireless broadcast network, comprising:
   detecting, on a mobile device, a modification of an overhead information symbol for a control channel in a wireless broadcast network; and
   monitoring the control channel from the mobile device based at least in part on the detected modification to receive a broadcast message.

52. The method of claim 51, further comprising receiving media content over a disparate channel of the wireless broadcast network.

53. The method of claim 52, further comprising processing the media content based at least in part on a content policy accessible from a disparate network.

54. The method of claim 52, wherein the broadcast message comprises a link for purchasing receipt of the media content over the wireless broadcast network.

55. The method of claim 51, wherein the broadcast message is an emergency alert message.

56. The method of claim 55, wherein the application interrupts a disparate application to display the emergency alert message.

57. The method of claim 55, further comprising analyzing a region specified in the emergency alert message to ensure applicability to the mobile device.

58. The method of claim 51, further comprising suspending control channel monitoring until a subsequent modification is detected of the overhead information symbol.

59. The method of claim 51, wherein the modification includes incrementing a sequence number overhead information symbol related to the control channel.

60. A computer program product, comprising:
   a non-transitory computer-readable medium having computer readable instructions stored thereon, the instructions being executable by a computing device to perform acts comprising:
      causing at least one computer to detect a modification of an overhead information symbol for a control channel in a wireless broadcast network; and
      causing the at least one computer to monitor the control channel based at least in part on the detected modification to receive a broadcast message.

* * * * *